United States Patent
Jung et al.

(10) Patent No.: US 9,191,861 B2
(45) Date of Patent: Nov. 17, 2015

(54) TETHERING METHOD AND MOBILE DEVICE ADAPTED THERETO

(75) Inventors: Bu Seop Jung, Suwon-si (KR); Jung Hun Lee, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 511 days.

(21) Appl. No.: 13/108,257

(22) Filed: May 16, 2011

(65) Prior Publication Data

US 2011/0283001 A1    Nov. 17, 2011

(30) Foreign Application Priority Data

May 17, 2010    (KR) ........................ 10-2010-0046001

(51) Int. Cl.
*H04W 28/26*    (2009.01)
*H04W 28/16*    (2009.01)
*H04W 8/26*    (2009.01)
*H04W 76/02*    (2009.01)

(52) U.S. Cl.
CPC ............... *H04W 28/16* (2013.01); *H04W 8/26* (2013.01); *H04W 76/02* (2013.01)

(58) Field of Classification Search
CPC ... H04W 76/00; H04W 76/02; H04W 76/025; H04W 28/16; H04W 8/26
USPC .......... 709/227, 228, 229; 370/277, 401, 431; 455/26.1, 436, 439, 445
See application file for complete search history.

(56) References Cited

U.S. PATENT DOCUMENTS

| | | | | |
|---|---|---|---|---|
| 7,607,015 | B2* | 10/2009 | Fascenda ....................... | 713/171 |
| 2003/0228842 | A1* | 12/2003 | Heinonen et al. ............ | 455/41.2 |
| 2004/0068653 | A1* | 4/2004 | Fascenda ....................... | 713/168 |
| 2005/0020262 | A1* | 1/2005 | Kim .......................... | 455/435.1 |
| 2006/0031515 | A1* | 2/2006 | Van Gassel et al. .......... | 709/227 |
| 2006/0085543 | A1* | 4/2006 | Hrastar et al. ................ | 709/224 |
| 2006/0153122 | A1* | 7/2006 | Hinman et al. ............... | 370/328 |
| 2006/0161664 | A1* | 7/2006 | Motoyama .................... | 709/228 |
| 2008/0151842 | A1* | 6/2008 | Tysowski et al. ............. | 370/338 |
| 2008/0181161 | A1* | 7/2008 | Gi Kim et al. ................ | 370/312 |
| 2010/0054154 | A1* | 3/2010 | Lambert et al. ............... | 370/254 |
| 2010/0161725 | A1* | 6/2010 | Gershom ...................... | 709/203 |
| 2011/0145421 | A1* | 6/2011 | Yao et al. ..................... | 709/228 |

* cited by examiner

*Primary Examiner* — Paul H Masur
*Assistant Examiner* — Kabir Jahangir
(74) *Attorney, Agent, or Firm* — Jefferson IP Law, LLP (57) ABSTRACT

A mobile device and a method for providing a tethering service via a security mode and a list of preferred mobile devices are provided. The method includes determining, when the mobile device receives a connection request from a client mobile device, a number of client mobile devices that are currently connected to the mobile device, determining, when the number of connected client mobile devices is less than a preset maximum connection number, the number of created Basic Service Sets (BSSs), determining, when the number of BSSs is less than a preset maximum creation number, the identification-information regarding the client mobile device that requested connection, and providing a tethering service to the client mobile device according to the determined identification-information.

20 Claims, 11 Drawing Sheets

TETHERING METHOD AND MOBILE DEVICE ADAPTED THERETO

PRIORITY

This application claims the benefit under 35 U.S.C. §119 (a) of a Korean patent application filed on May 17, 2010 in the Korean Intellectual Property Office and assigned Serial No. 10-2010-0046001, the entire disclosure of which is hereby incorporated by reference.

BACKGROUND OF THE INVENTION

1. Field of the Invention

The present invention relates to Internet-enabled mobile devices that can provide Internet services and a method thereof. More particularly, the present invention relates to a tethering method for enabling an Internet-enabled mobile device to share the Internet services with other mobile devices, which cannot provide Internet services, by a tethering function.

2. Description of the Related Art

Tethering is a method that allows mobile devices, which cannot access a communication network, to share the Internet connection of an Internet-enabled mobile device that can access the communication network via $2^{nd}$ Generation (2G) or $3^{rd}$ Generation (3G) technology.

Tethering has been used to provide ad hoc service in a Wi-Fi network. That is, tethering allows nodes, which are distributed and can wirelessly communicate with each other without any access point, to provide Internet services via a network of a self-controlling structure.

However, ad hoc services do not provide a stable network connection so that data cannot be stably transferred. Ad hoc services are disadvantageous in that they limit the number of mobile devices that can be connected to the network and mobile devices connected to the network cannot enter an idle mode. In order to address these problems in ad hoc services, research has been conducted to develop mobile devices that can provide a tethering function using an Access Point.

However, a need still exists for a tethering method for enabling an Internet-enabled mobile device to share the Internet services with other mobile devices, which cannot provide Internet services, by a tethering function.

SUMMARY OF INVENTION

Aspects of the present invention are to address the above-mentioned problems and/or disadvantages and to provide at least the advantages described below. Accordingly, an aspect of the present invention is to provide Internet-enabled mobile devices that can provide Internet services and a method thereof.

In accordance with an aspect of the present invention, a tethering method of a mobile device is provided. The method includes determining, when the mobile device receives a connection request from a client mobile device, a number of client mobile devices that are currently connected to the mobile device, determining a number of created Basic Service Sets (BSSs) when the number of connected client mobile devices is less than a preset maximum connection number, determining identification-information regarding the client mobile device that requested connection when the number of BSSs is less than a preset maximum creation number, and providing a tethering service to the client mobile device according to the determined identification-information.

The providing of the tethering service may include providing a tethering service to the client mobile device that requested connection, when the determined identification-information is included in a list of preferred mobile devices that are previously set, determining whether a preferred mobile device registration is selected, when the determined identification-information is not included in a list of preferred mobile devices that are previously set, and updating, when a preferred mobile device registration is selected, BSS creation information, set in the client mobile device, in the list of preferred mobile devices.

The list of preferred mobile devices may include at least one of a Media Access Control (MAC) address of the client mobile device, an encryption key, a security mode, a Service Set Identifier (SSID), and identification-information regarding the client mobile device.

The determining of the number of created BSSs may include determining, when the number of BSSs is equal to or greater than a preset maximum creation number, creation information by BSSs that has already been created, determining whether there is a BSS that is created in a security mode that is the same as the client mobile device that requested connection, via the determined creation information by the BSSs, and providing a tethering service to the client mobile device that requested connection, using the BSS created in the same security mode.

In accordance with an aspect of the present invention, a mobile device for performing a tethering function is provided. The device includes a short-range communication unit for receiving a connection request from a client mobile device, a storage unit for storing a list of preferred mobile devices used for determining whether the client mobile device is a preferred mobile device, and for storing BSS creation information, and a controller for determining the number of client mobile devices currently connected to the mobile device when it receives the connection request via the short-range communication unit, for determining the number of created BSSs when the number of connected client mobile devices is less than a preset maximum connection number, and for determining, when the number of BSSs is less than a preset maximum creation number, a tethering service to the client mobile device according to identification-information regarding the client mobile device that requested connection.

The controller may further include providing a tethering service to the client mobile device that requested connection, when the identification-information is included in a list of preferred mobile devices that are previously set, determining whether a preferred mobile device registration is selected, when the determined identification-information is not included in a list of preferred mobile devices that are previously set, and updating, when a preferred mobile device registration is selected, BSS creation information, set in the client mobile device, in the list of preferred mobile devices. The list of preferred mobile devices may include at least one of a MAC address of the client mobile device, an encryption key, a security mode, an SSID, and identification-information regarding the client mobile device.

The controller may further include determining, when the number of BSSs is equal to or greater than a preset maximum creation number, creation information by BSSs that has already been created, determining whether there is a BSS that is created in a security mode that is the same as the client mobile device that requested connection, via the determined creation information by BSSs, and providing a tethering service to the client mobile device that requested connection, using the BSS created in the same security mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Particular terms may be defined herein to describe the exemplary embodiments of the present invention in the best manner. Accordingly, the meaning of specific terms or words used in the specification and the claims should not be limited to the literal or commonly employed sense, but should be construed in accordance with the spirit of the invention.

In exemplary embodiments of the present invention, mobile devices or mobile communication devices refer to information processing devices or Internet-enabled mobile devices that can be connected in a wired/wireless connection with other mobile devices to transmit/receive data therebetween, can be connected to a network to transmit/receive data thereto/therefrom, and can also serve as Access Points (APs).

Client mobile devices refer to devices that are connected to a modem or a network in order to use Internet services. An example of a client mobile device is a laptop computer.

In exemplary embodiments of the present invention, Service Set Identifier (SSID) refers to a unique identifier of 32 bytes that are added to each header of data transmitted via a Wireless Local Area Network (WLAN). The SSID serves as a passkey that is used when client mobile devices are connected to a Basic Service Set (BSS). The SSID is set to differentiate WLANs. For example, all APs or client mobile devices connected to one WLAN need to use the same SSID. In an exemplary embodiment of the present invention, SSID is assumed to be a multi SSID. A multi SSID refers to a number of SSIDs that perform a broadcasting process at one AP. The number of multi SSIDs may vary according to the capacity of APs or of mobile devices serving as APs. According to the use of a multi SSID, the client mobile devices recognize that there are a number of APs. In addition, a number of SSIDs forming the multi SSID are set with different security modes, respectively, and this increases the mobility and efficiency in the structure of a network.

A security mode is executed to set the security for data transmitted/received when a mobile device is connected to the network via tethering. It has a variety of security levels, such as, an Open Protocol Enhanced Networks (OPEN), a Wired Equivalent Privacy (WEP), a Wi-Fi Protected Access 1 (WPA1), a Wi-Fi Protected Access 2 (WPA2), and the like.

The BSS is a basic wireless network unit of a WLAN. The BSS is a set of a number of mobile devices that can communicate with each other under the control of one coordinator (or Coordination Function). The BSS includes one AP and a number of mobile devices and may be configured as described in the following processes.

A user sets BSS creation information, such as an encryption key, a security mode, an SSID, and the like, of an AP. In that case, the mobile device activates the AP function based on the set BSS creation information. The client mobile devices detect the BSS creation information set in the mobile device. The client mobile devices scan the mobile devices that can perform an AP function and detect a network-connectable mobile device. For example, when the user inputs connection information, such as an SSID and an encryption key, to the client mobile device, the client mobile device transmits it to the detected network-connectable mobile device. The network-connectable mobile device receives and determines the connection information, and then connects to the client mobile device.

FIGS. 1 through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
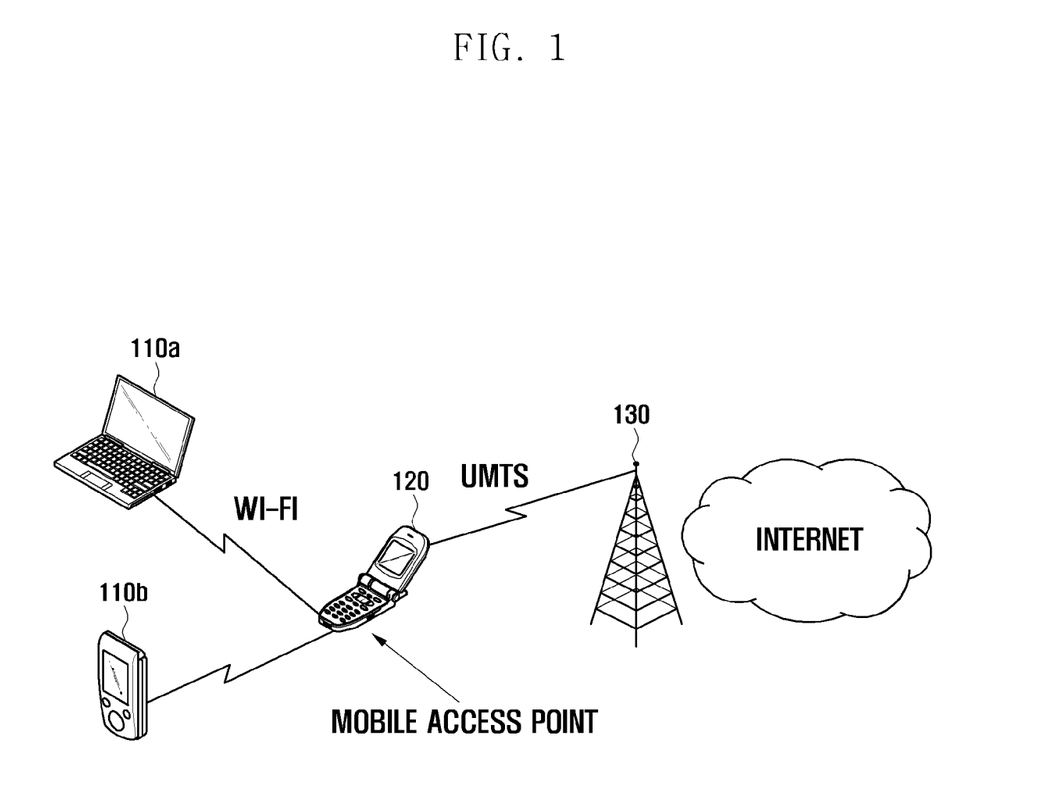
FIG. 1 illustrates a mobile communication system according to an exemplary embodiment of the present invention.

FIG. 1 illustrates a mobile communication system according to an exemplary embodiment of the present invention.

Referring to FIG. 1, a mobile communication system includes client mobile devices 110a and 110b, a mobile device 120, and an Internet service provider 130.

The client mobile devices 110a and 110b refer to devices that cannot be directly connected to the Internet service provider 130 so that they cannot provide Internet services. The mobile device 120 may be directly connected to the Internet service provider 130 and provide a variety of Internet services. The Internet service provider 130 may transmit/receive data to/from devices connected thereto, and provide Internet services thereto.

The client mobile devices 110a and 110b are connected to the mobile device 120 via a short-range communication network, such as a Wi-Fi network, or via a cable. The mobile device 120 is connected to the Internet service provider 130 via a wireless communication network, such as a Universal Mobile Telecommunication System (UMTS), and the like. The mobile device 120 serves as a Mobile Access Point that can connect the client mobile devices 110a and 110b and the Internet service provider 130 so that they can communicate with each other. The mobile device 120, located between external devices and the Internet service provider, serves as a modem, and accordingly serves to provide a modem function, which is called a tethering function or a tethering service.

In the following description, a tethering method and the configuration of the mobile device 120 are described with reference to FIG. 2.

Figure 2:
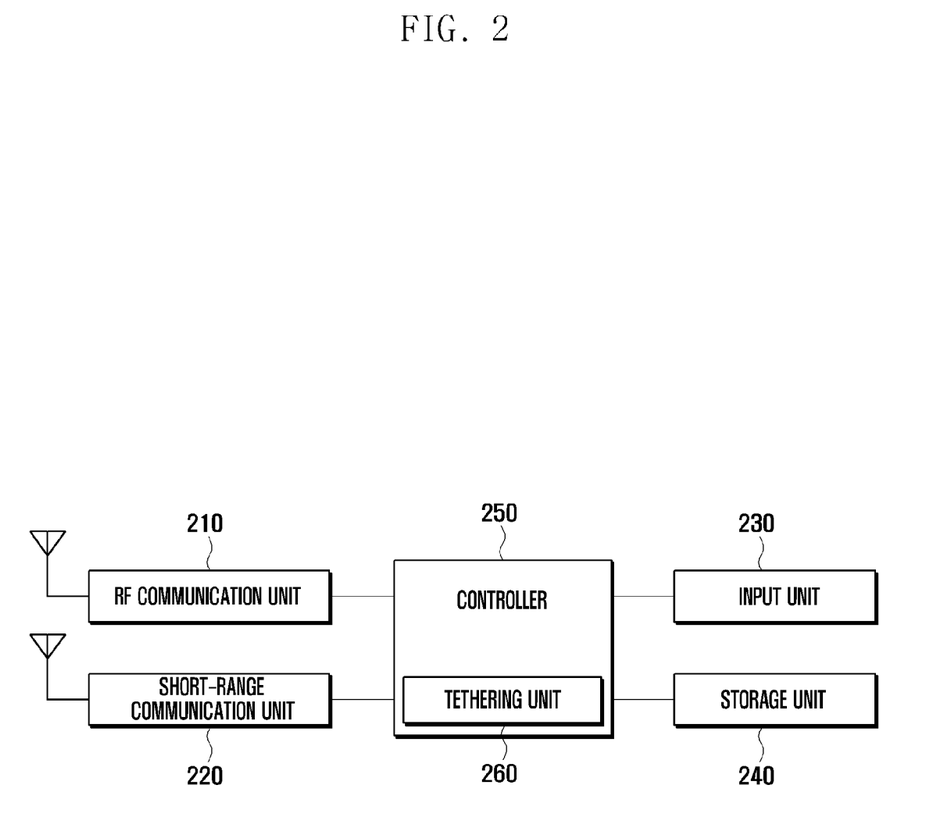
FIG. 2 illustrates a mobile device according to an exemplary embodiment of the present invention.

FIG. 2 illustrates a mobile device according to an exemplary embodiment of the present invention.

Referring to FIG. 2, the mobile device 120 includes a Radio Frequency (RF) communication unit 210, a short-range communication unit 220, an input unit 230, a storage unit 240, and a controller 250.

The RF communication unit 210 performs data communication between the mobile device 120 and a base station and performs data communication with a service provider that provides a data communication service, such as an Internet service. The RF communication unit 210 includes a duplexer for demultiplexing transmission and reception functions, a transmitter for up-converting the frequency of signals to be transmitted, and a receiver for down-converting the frequency of received signals.

The short-range communication unit 220 performs communication with other mobile devices within a certain coverage area and may be implemented with various types of wireless communication modules, such as a Bluetooth module, a Wi-Fi module, and the like. During the tethering process, the short-range communication unit 220 is connected to a client mobile device and transmits data from the service provider to the client mobile device, under the control of the controller 250. In addition, the short-range communication unit 220 receives data from the client mobile device and transmits it to the service provider under the control of the controller 250.

The input unit 230 receives signals related to the control of the mobile device 120 and the settings of functions, and outputs them to the controller 250. The input unit 230 may be implemented with a touch screen or a keypad and may include function keys, soft keys, and the like, to select corresponding functions, i.e., to execute a tethering function.

The storage unit 240 stores applications for executing functions in the mobile device 120 and also stores data when the applications are executed. More particularly, the storage unit 240 stores BSS creation information for performing a tethering function under the control of the controller 250, and also stores a list of preferred mobile devices that is used to select a preferred mobile device. The structures of the list of preferred mobile devices and the BSS creation information will be described later with reference to FIG. 3.

The controller 250 controls the entire operation and state of the components included in the mobile device 120. The controller 250 controls the tethering process so that the client mobile devices may provide Internet services. To this end, the controller 250 includes a tethering unit 260.

The tethering unit 260 performs a tethering function with a client mobile device via the short-range communication unit 220. When the tethering unit 260 receives a connection request to use a tethering service from a client mobile device via the short-range communication unit 220, it determines the number of client mobile devices that are currently receiving a tethering service. Thereafter, the tethering unit 260 determines whether the determined number of client mobile devices is equal to or greater than a preset maximum connection number. The maximum connection number refers to the number of client mobile devices that can be connected to the mobile device in order to use a tethering service.

When the tethering unit 260 ascertains that the determined number of client mobile devices is less than a preset maximum connection number, it further determines whether the number of created BSSs is equal to or greater than a preset maximum creation number. The preset maximum creation number refers to the number of BSSs that can be maximally created to perform a tethering function. When the tethering unit 260 ascertains that the number of created BSSs is less than a preset maximum creation number, it determines the identification-information regarding the client mobile device requested for connection. Thereafter, the tethering unit 260 determines whether the determined identification-information is included in a list of preferred mobile devices. The list of preferred mobile devices includes detailed information regarding client mobile devices that frequently use the tethering function via the mobile device, Media Access Control (MAC) address of client mobile devices, and BSS creation information. The BSS creation information includes information regarding an SSID, a security mode, and an encryption key, and the like, set to client mobile devices that are connected to the network.

When the tethering unit 260 ascertains that the determined identification-information is included in a list of preferred mobile devices, it provides a tethering service to the client mobile device that requested connection. That is, the tethering unit 260 is connected to the client mobile device that requested connection, using the BSS creation information included in the list of preferred mobile devices, and then provides a tethering service thereto.

In contrast, when the tethering unit 260 ascertains that the number of created BSSs is equal to or greater than a preset maximum creation number, it determines the security mode of the client mobile device that requested connection, and then provides a tethering service thereto. That is, the tethering unit 260 determines creation information according to created BSSs.

The tethering unit 260 determines whether there is a BSS with a security mode that is the same as the client mobile device. When the tethering unit 260 ascertains that there is a BSS with a security mode that is the same as the client mobile device, it is connected to the client mobile device using the BSS, and then provides a tethering service to the client mobile device.

Alternatively, the tethering unit 260 determines whether a client mobile device that currently requests connection is included in a list of preferred mobile devices stored in the storage unit 240, and then provides a tethering service thereto. That is, the tethering unit 260 determines whether the identification-information regarding a client mobile device that requests connection is included in a list of preferred mobile devices stored in the storage unit 240. When the tethering unit 260 ascertains that the identification-information regarding a client mobile device that requests connection is included in a list of preferred mobile devices, it creates a BSS together with the client mobile device that requested connection, via the BSS creation information included in the list of preferred mobile devices.

In contrast, when the tethering unit 260 ascertains that the identification-information regarding a client mobile device that requests connection is not included in a list of preferred mobile devices, it determines whether registering a preferred mobile device is selected via the input unit 230. When the tethering unit 260 ascertains that registering a preferred mobile device is selected, it controls the storage unit 240 to store the MAC address, BSS creation information and identification-information regarding the client mobile device that requested connection in the list of preferred mobile devices. The tethering unit 260 may use a MAC filter via the stored MAC address. The MAC filter serves to perform a filtering function so that a MAC address that does not have permission is not allowed for connection in a Wi-Fi MAC layer. Therefore, the tethering unit 260 may only provide a tethering service to client mobile devices included in the list of preferred mobile devices.

When the mobile device receives a connection request from a client mobile device, it determines a list of preferred mobile devices, the number of created BSSs and the number of client mobile devices that are currently connected thereto, and then provides a tethering service to the client mobile device that requests connection. Although the mobile device is connected to client mobile devices via the short-range communication unit 220, the present invention is not limited thereto. For example, the mobile device may be connected to client mobile devices through a wired connection via an external connector, such as a Universal Serial Bus (USB) connector, and the like. In addition, although when the mobile device receives a connection request from a client mobile device, it provides a tethering service to the client mobile device, considering the number of created BSSs, and the number of client mobile devices that are currently connected thereto, the present invention is not limited thereto. For example, when the user selects one of the preferred mobile devices that are displayed in a list on the mobile device, the mobile device may provide a tethering service to a client mobile device corresponding to the selected mobile device.

In the following description, the information to be used to provide a tethering service, stored in the storage unit 240, is described with reference to FIG. 3.

Figure 3:
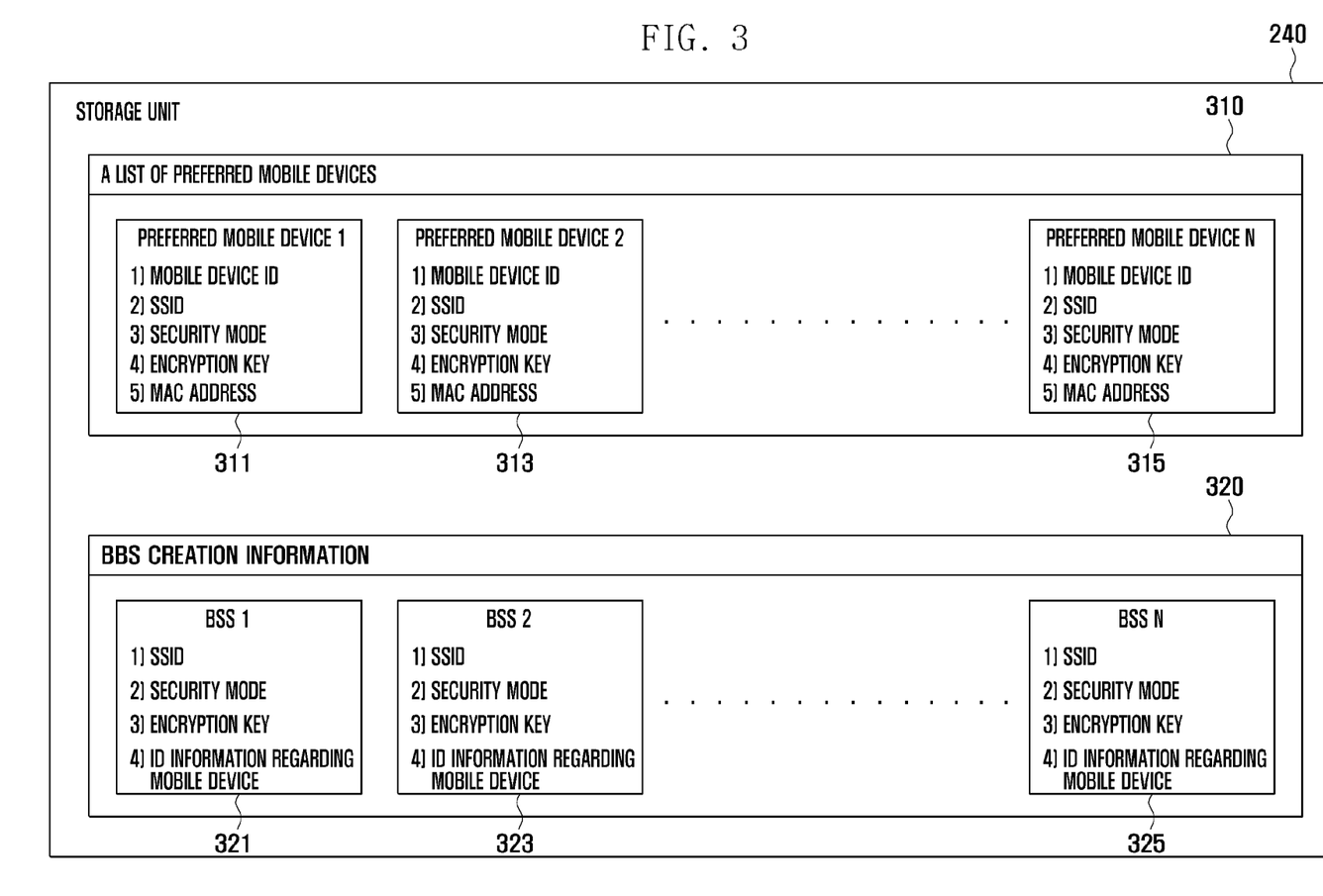
FIG. 3 illustrates information stored in a storage unit according to an exemplary embodiment of the present invention.

FIG. 3 illustrates information stored in a storage unit according to an exemplary embodiment of the present invention.

Referring to FIG. 3, the storage unit 240 stores a list 310 of preferred mobile devices and BSS creation information 320. The list 310 of preferred mobile devices is made according to the frequency of connection of a client mobile device or according to the user. The list 310 of preferred mobile devices includes various items, such as MAC addresses, encryption keys, security modes, SSIDs, and identification numbers of client mobile devices, according to client mobile devices. For example, as shown in FIG. 3, the list 310 of preferred mobile devices includes preferred mobile device 1 (311), preferred mobile device 2 (313), . . . , and preferred mobile device N (315), according to a user's registration. The names of preferred mobile device 1 (311), preferred mobile device 2 (313), . . . , and preferred mobile device N (315) may be altered by a user's selection, so that the user can easily search for a corresponding client mobile device from the list 310 of preferred mobile devices. In addition, the SSID, security mode, and encryption key, included in the list 310 of preferred mobile devices, may allow for easy configuration of BSS. This is because a mobile device supporting a Wi-Fi technology can store the profile of an AP that has connected thereto once, so that it may access the stored profile of the AP when it connects to the AP. Therefore, when the mobile device receives a connection request from a client mobile device set as a preferred mobile device, it may configure a BSS using the encryption key, security mode, and SSID serving as BSS creation information that was previously stored.

The BSS creation information 320 includes the identification-information regarding client mobile devices, the encryption key, security mode, and SSID of client mobile devices that are connected to the mobile device, according to the created BSSs. The BSS creation information 320 is stored in the storage unit 240, according to the BSSs created between the client mobile devices that are currently connected to the mobile device. That is, as shown in FIG. 3, the BSS creation information 320 regarding respective BSS 1 (321), BSS 2 (323), . . . , and BSS N (325) according to currently created BSSs is stored in the storage unit 240.

Figure 4:
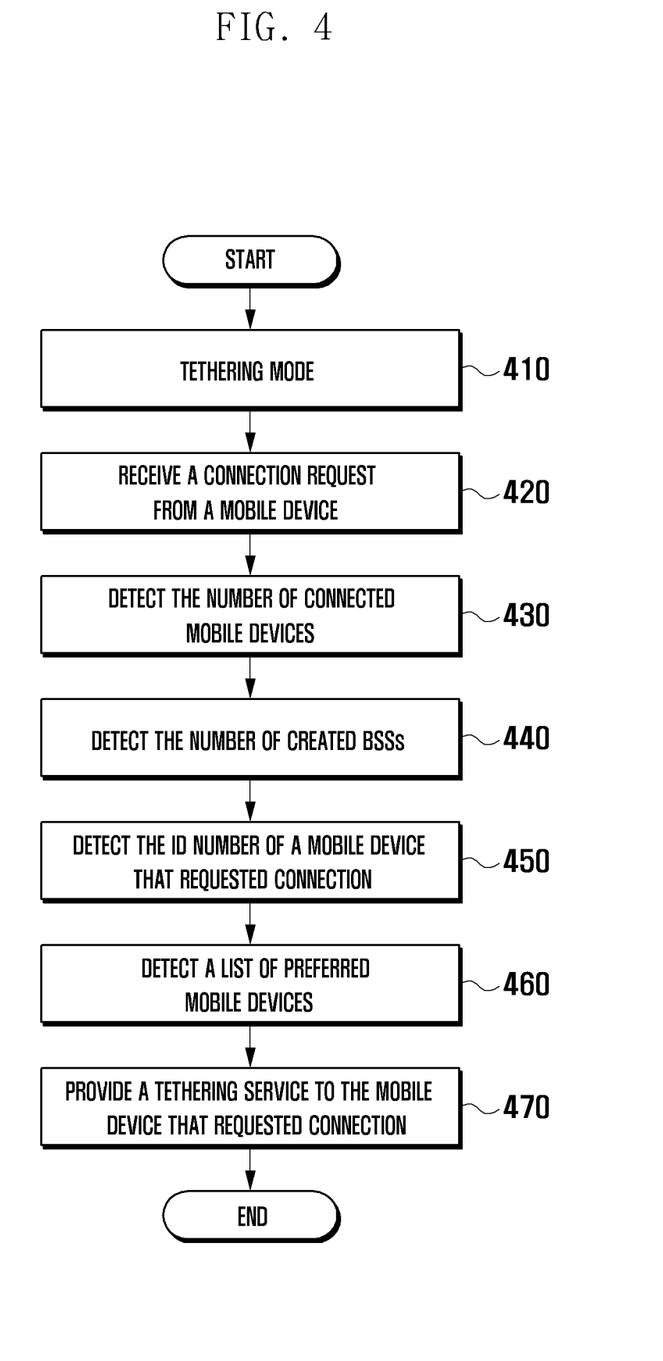
FIG. 4 is a flowchart illustrating a tethering method according to an exemplary embodiment of the present invention.

FIG. 4 is a flowchart illustrating a tethering method according to an exemplary embodiment of the present invention.

Referring to FIG. 4, a mobile device enters a tethering mode according to a user's selection in step 410. In a tethering mode, the mobile device may serve as an AP. When the mobile device receives a connection request from a client mobile device in step 420, it determines the number of client mobile devices connected thereto in step 430. That is, the mobile device determines whether the number of connected client mobile devices is equal to or greater than the maximum connection number. When the mobile device ascertains that the number of connected client mobile devices is less than the maximum connection number, it performs the following steps.

In step 440, the mobile device determines the number of BSSs created according to the connected client mobile device. The mobile device determines whether the number of created BSSs is the maximum creation number. When the mobile device ascertains that the number of created BSSs is less than the maximum creation number, it performs the following steps.

After determining the number of created BSSs in step 440, the mobile device determines the identification-information regarding a client mobile device that requests connection in step 450. Thereafter, the mobile device determines whether the identification-information regarding the determined client mobile device is included in a list of mobile devices in step 460. When the mobile device ascertains that the identification-information regarding the determined client mobile device is included in a list of mobile devices at step 460, it provides a tethering service to the client mobile device that requested connection in step 470.

Figure 5A:
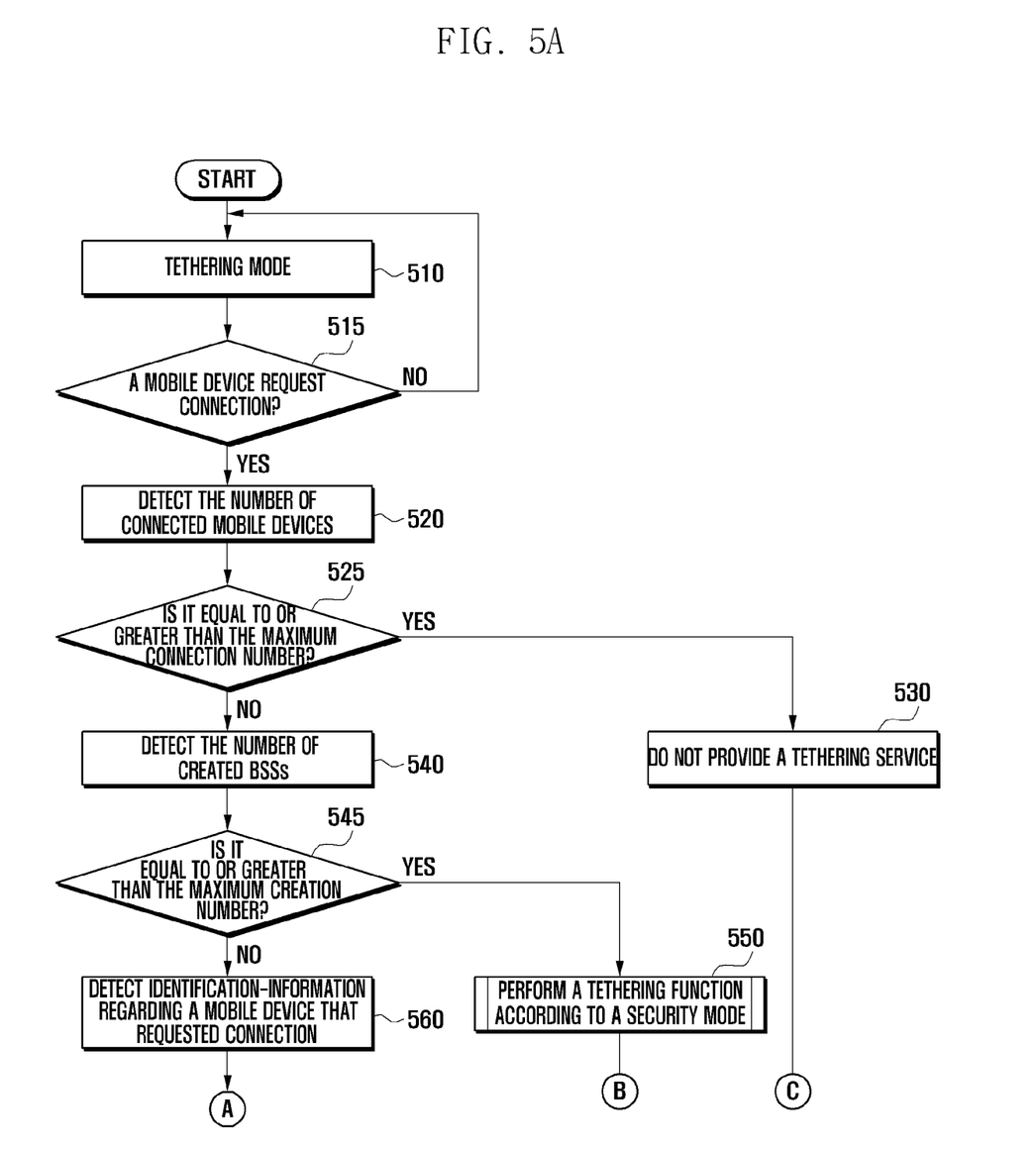
FIGS. 5A and 5B are flowcharts illustrating a tethering method under a condition according to exemplary embodiments of the present invention.
Figure 5B:
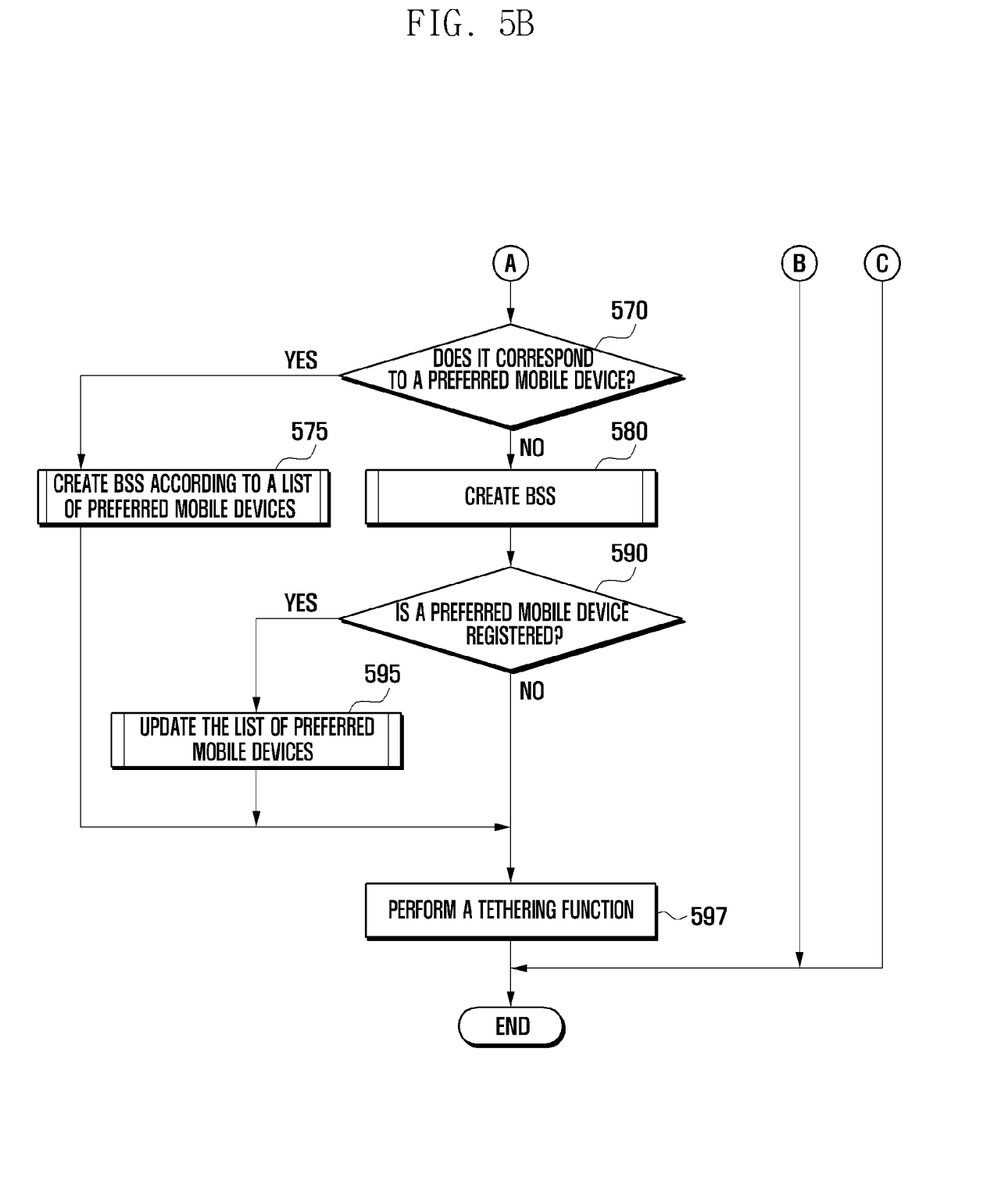

The following description provides a tethering method of a mobile device according to a preset condition with reference to FIGS. 5A and 5B.

FIGS. 5A and 5B are flowcharts illustrating a tethering method under a condition according to exemplary embodiments of the present invention.

Referring to FIGS. 5A and 5B, a mobile device enters a tethering mode in step 510. The mobile device determines whether it receives a connection request from a client mobile device to provide Internet services in step 515. If it is determined in step 515 that the mobile device receives a connection request from a client mobile device, the mobile device determines the number of client mobile devices that are currently connected thereto in order to provide Internet services in step 520. The reason to determine the number of client mobile devices is because the number of client mobile device that can be connected to the mobile device may be limited by the restriction factors, such as the memory capacity, the performance of a CPU of the mobile device, and the like.

Thereafter, the mobile device determines whether the number of determined client mobile devices is equal to or greater than a preset maximum connection number in step 525. If it is determined in step 525 that the mobile device ascertains that the number of determined client mobile devices is equal to or greater than a preset maximum connection number, it transmits a message, stating that a tethering service cannot be provided, to the client mobile device that requested connection in step 530. Although it was not shown in the drawings, the mobile device may determine the degree of importance between client mobile devices that have been connected to the mobile device and a client mobile device that currently requests connection, and then may disconnect part of the client mobile devices that have been connected thereto.

In contrast, if it is determined in step 525 that the mobile device ascertains that the number of determined client mobile devices is less than a preset maximum connection number, it determines the number of created BSSs in order to provide a tethering service in step 540. The reason to determine the number of created BSSs is because the number of BSSs that can be configured may be limited by restriction factors, such as the memory capacity, the performance of a CPU of the mobile device, and the like.

In step 545, the mobile device determines whether the number of created BSSs is equal to or greater than the maximum creation number. If it is determined in step 545 that the mobile device ascertains that the number of created BSSs is equal to or greater than the maximum creation number, it performs a tethering function according to a security mode set in the client mobile device that requested connection in step 550, which will be described later, with reference to FIG. 6.

In contrast, if it is determined in step 545 that the mobile device ascertains that the number of created BSSs is less than the maximum creation number, it determines the identification-information regarding the client mobile device that requested connection in step 560. Thereafter, the mobile device determines whether the client mobile device that requested connection is a preferred mobile device in step 570. The determination of the mobile device in step 570 may be made via a list of preferred mobile devices. The list of preferred mobile devices includes identification-information regarding client mobile devices that are frequently connected to the mobile device, BSS creation information, such as security levels and SSIDs set in the client mobile devices, and the MAC address of the client mobile devices. Therefore, the mobile device detects that a client mobile device that requests connection is a preferred mobile device, by determining whether the identification-information regarding the client mobile device is included in the list of preferred mobile devices.

If it is determined in step 570 that the client mobile device that requested connection is a preferred mobile device, it creates a BSS based on the list of preferred mobile devices in step 575, which will be described later, with reference to FIG. 7. In contrast, if it is determined in step 570 that the client mobile device that requested connection is not a preferred mobile device, it creates a BSS in step 580, which will be described later, with reference to FIG. 8.

Thereafter, the mobile device that has created a BSS and the client mobile device that requested connection determine whether the user selects a preferred mobile device registration in step 590. If it is determined in step 590 that the user selects a preferred mobile device registration, it updates the list of preferred mobile devices in step 595. That is, when the mobile device creates BSSs, it updates the list of preferred mobile devices, by mapping a MAC address of the client mobile device, an encryption key, a security mode, and a SSID, set in the client mobile device that requested connection, to the identification-information regarding the client mobile device that requested connection.

Thereafter, the mobile device is connected to the client mobile device that requested connection and performs a tethering function in step 597. Therefore, the client mobile device may provide data services, such as Internet services, to the user via the tethering function of the mobile device.

Figure 6:
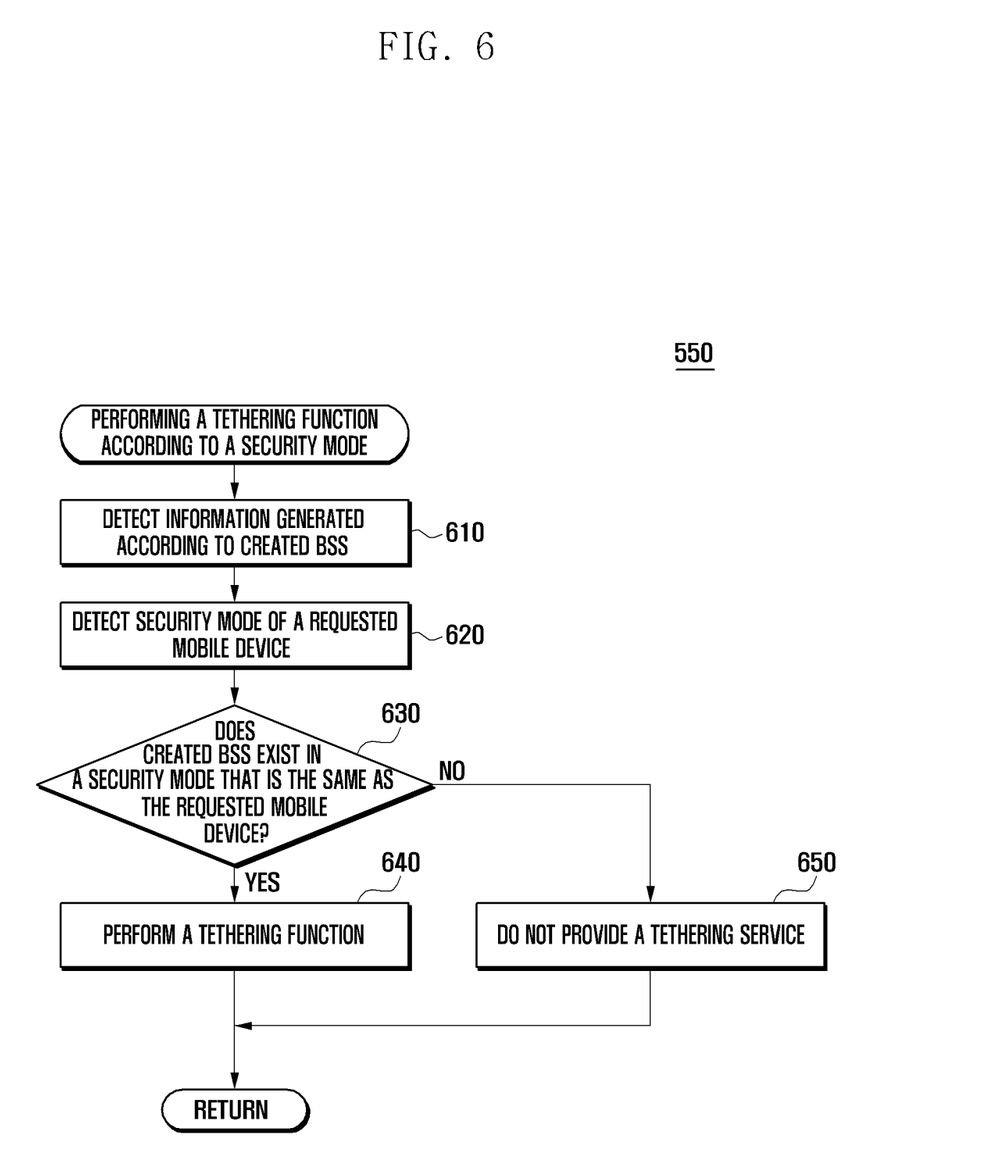
FIG. 6 is a flowchart illustrating a tethering method according to a security mode according to an exemplary embodiment of the present invention.

The following description provides a tethering method according to a security mode, with reference to FIG. 6.

FIG. 6 is a flowchart illustrating a tethering method according to a security mode according to an exemplary embodiment of the present invention.

Referring to FIG. 6, a mobile device determines creation information according to created BSSs in step 610. The BSS creation information includes information regarding an encryption key, a security mode and an SSID of a client mobile device that requests connection. Thereafter, the mobile device determines the security mode of the client mobile device that requested connection in step 620.

After determining the security mode in step 620, the mobile device determines whether there is a BSS created in a security mode that is the same as the client mobile device that requested connection in step 630. That is, the mobile device determines whether there is a security mode that is the same security mode as the client mobile device that requested connection, in the creation information according to BSSs.

If it is determined in step 630 that the mobile device ascertains that there is a BSS created in a security mode that is the same as the client mobile device that requested connection, it provides a tethering service to the client mobile device that requested connection, using the BSS with the same security mode in step 640. In contrast, if it is determined in step 630 that the mobile device ascertains that there is a BSS created in a security mode that is not the same as the client mobile device that requested connection, it transmits a message, stating that a tethering service cannot be provided, to the client mobile device that requested connection in step 650.

Figure 7:
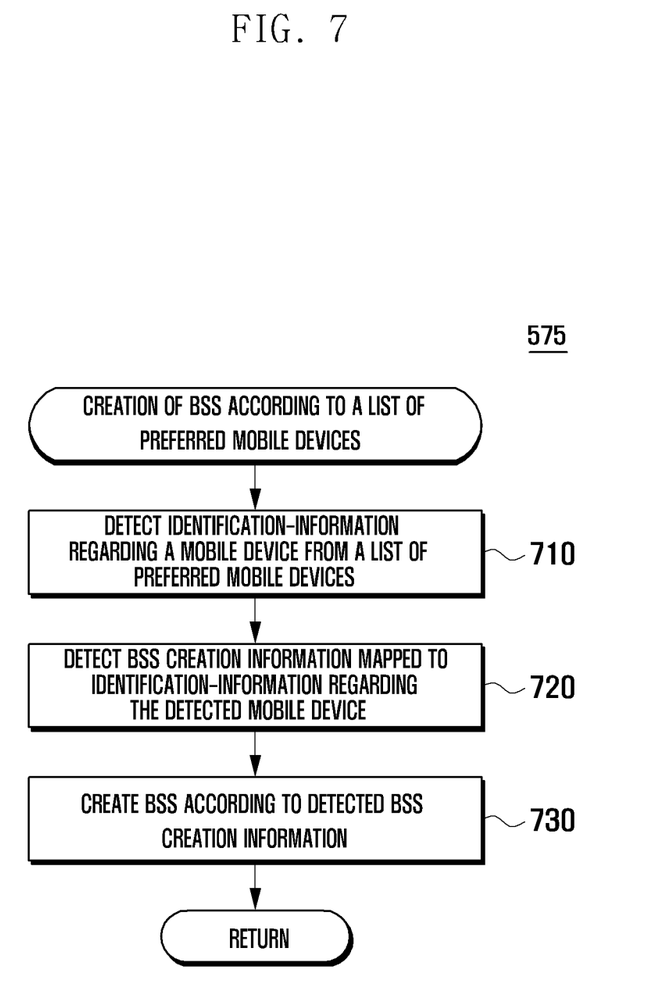
FIG. 7 is a flowchart illustrating a tethering method based on a list of preferred mobile devices according to an exemplary embodiment of the present invention.

The following description provides a tethering method by creating a BSS according to a list of preferred mobile devices, with reference to FIG. 7.

FIG. 7 is a flowchart illustrating a tethering method based on a list of preferred mobile devices according to an exemplary embodiment of the present invention.

Referring to FIG. 7, a mobile device determines the identification-information regarding a client mobile device in a list of preferred mobile devices in step 710. The mobile device determines BSS creation information mapped to the determined client mobile device in step 720. The BSS creation information includes information, such as an encryption key, a security mode, and an SSID, set in the client mobile device that requests connection. Thereafter, the mobile device creates a BSS, using the determined BSS creation information and a MAC address of the client mobile device in step 730.

The foregoing description has described the tethering method when the mobile device receives a connection request from a client mobile device included in a list of preferred mobile devices.

Figure 8:
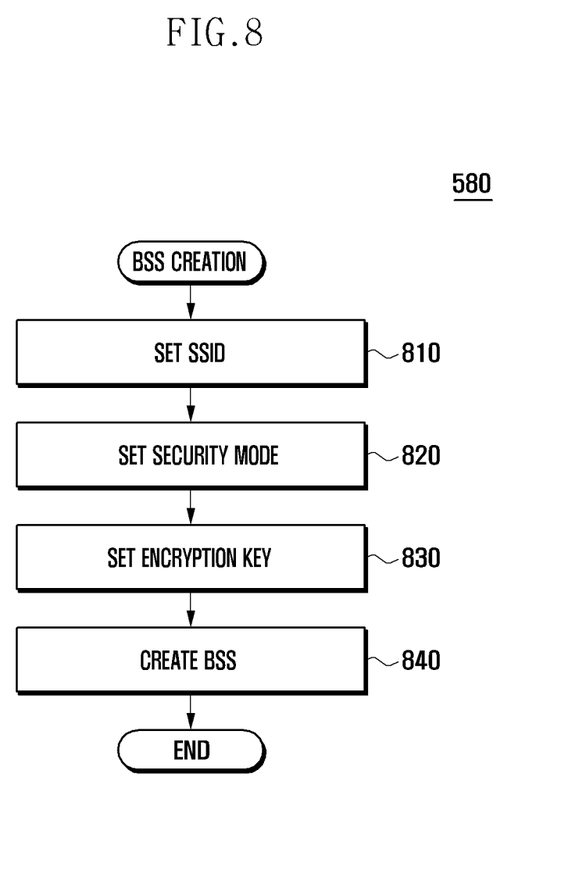
FIG. 8 is a flowchart illustrating a method for creating a Basic Service Set (BSS) to perform a tethering process according to an exemplary embodiment of the present invention.

FIG. 8 is a flowchart illustrating a method for creating a BSS to perform a tethering process according to an exemplary embodiment of the present invention.

Referring to FIG. 8, a mobile device sets the SSID to provide a tethering service to a client mobile device that requested connection according to a user's input via the input unit 230 in step 810. The mobile device sets a security mode to the client mobile device that requested connection in step 820. The security mode may be set according to the security levels, for example, OPEN, WEP, WPA1, WPA2, and the like. The mobile device sets an encryption key to the client mobile device in step 830. After setting information that requires creating a BSS, the mobile device creates a BSS with respect to the client mobile device that requested connection in step 840.

The mobile device may provide a tethering service to a number of client mobile devices using the multi SSIDs, via the processes described above. In addition, the mobile device may create BSSs up to the maximum number, flexibly according to the security mode of the client mobile device that is connected thereto, and may also delete them. In addition, when the mobile device ascertains that a client mobile device that requests connection is a preferred mobile device that has been registered when it starts to perform a tethering function, it may provide a tethering service to the client mobile device, using the BSS creation information that was set previously.

Figure 9:
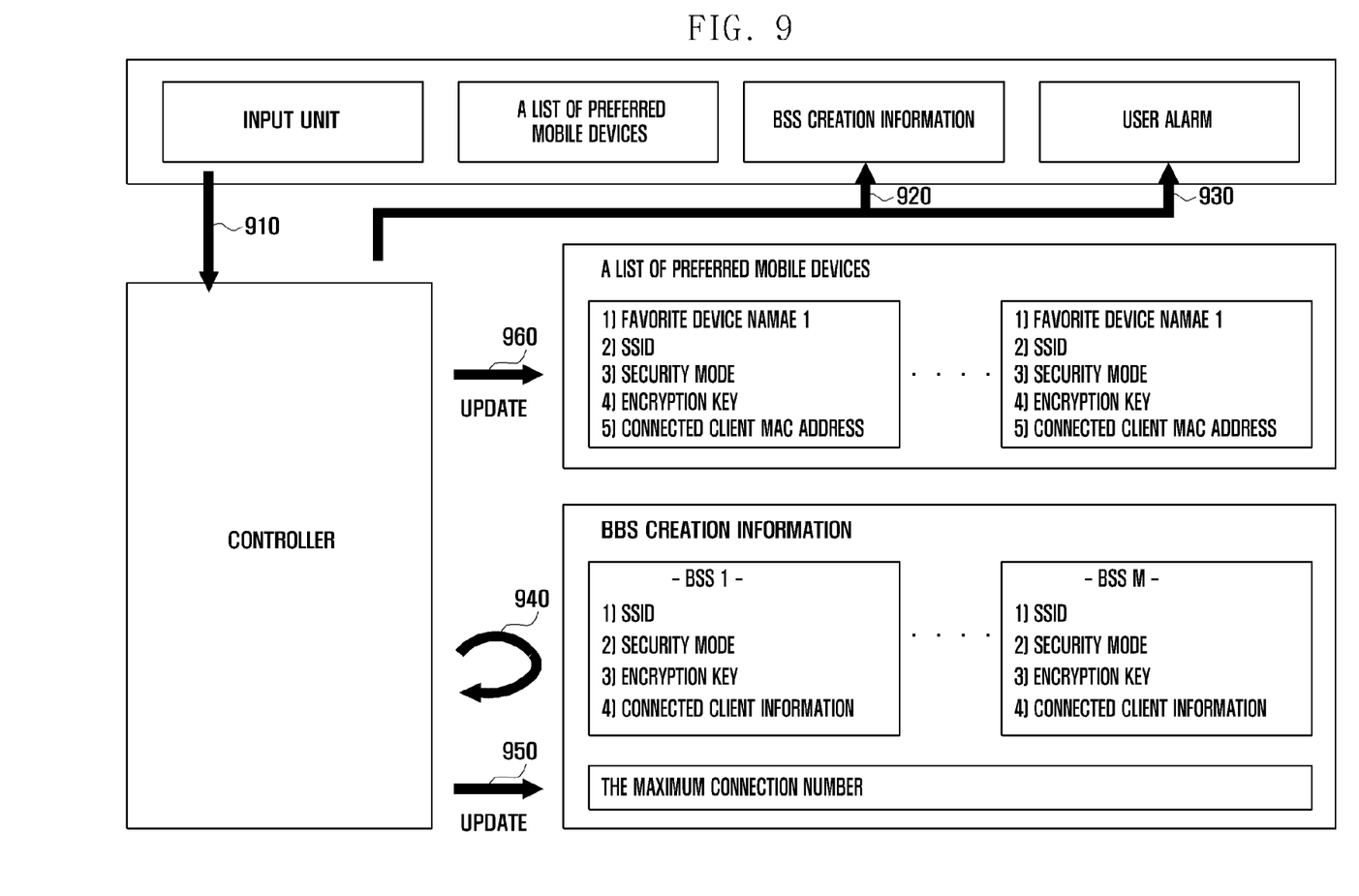
FIG. 9 is a diagram illustrating a method for creating a BSS according to a security mode of a mobile device according to an exemplary embodiment of the present invention.

FIG. 9 is a diagram illustrating a method for creating a BSS according to a security mode of a mobile device according to an exemplary embodiment of the present invention.

Referring to FIG. 9, when a user executes a tethering mode via the input unit 230 in step 910, the controller 250 determines the number of client mobile devices that are currently connected to the mobile device, with regard to the BSS creation information stored in the storage unit 240, in step 920. The controller 250 determines whether the number of client mobile devices that are currently connected to the mobile device is equal to or greater than a preset maximum connection number. When the controller 250 ascertains that the number of client mobile devices is equal to or greater than a preset maximum connection number, it executes a user alarm to inform the user that a tethering service cannot be used in step 930.

In contrast, when the controller 250 ascertains that the number of client mobile devices is less than a preset maximum connection number, it creates a BSS with the client mobile device that requested connection. Thereafter, the controller 250 updates the BSS creation information in the storage unit 240 in step 940, and also the maximum connection number in step 950. The controller 250 may update the list of preferred mobile devices according to a user's selection in step 960. That is, the controller 250 determines whether the user selects a preferred mobile device registration. When the controller 250 ascertains that the user selects a preferred mobile device registration, it determines a MAC address, an encryption key, a security mode, an SSID, and identification-information regarding the client mobile device that requested connection, and then updates the list of preferred mobile devices in the storage unit 240.

Figure 10:
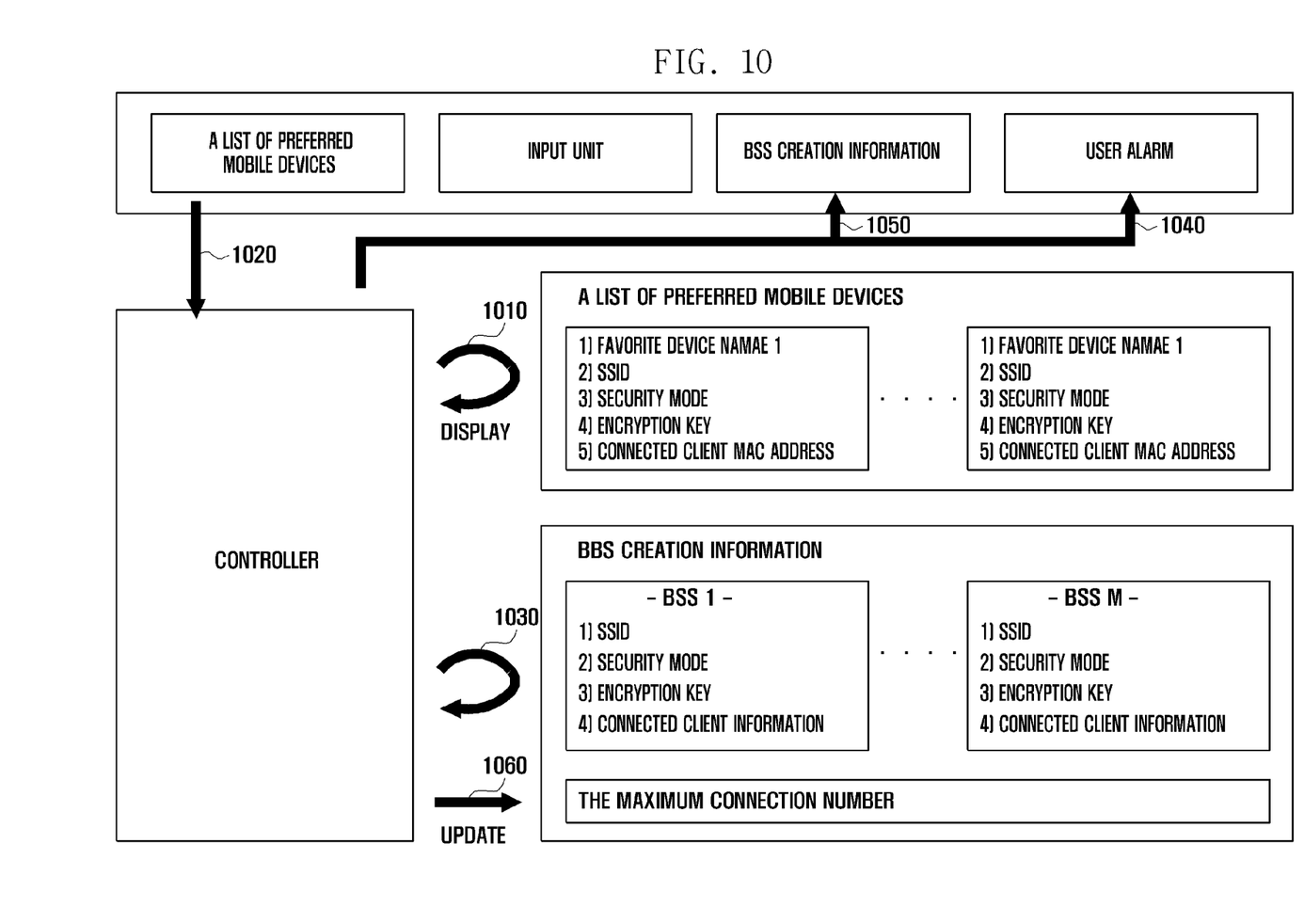
FIG. 10 is a diagram illustrating a method for creating a BSS based on a list of preferred mobile devices according to an exemplary embodiment of the present invention.

FIG. 10 is a diagram illustrating a method for creating a BSS based on a list of preferred mobile devices according to an exemplary embodiment of the present invention.

Referring to FIG. 10, the controller 250 displays a list of preferred mobile devices stored in the storage unit 240, on the display unit, according to a user's selection in step 1010. When the user selects one of the preferred mobile devices in the list in step 1020, the controller 250 determines the BSS creation information stored in the storage unit 240 in step 1050. The controller 250 determines whether the number of client mobile devices connected to the mobile device is equal to or greater than a preset maximum connection number. When the controller 250 ascertains that the number of client mobile devices is equal to or greater than a preset maximum connection number, it informs the user that a tethering service cannot be provided in step 1040.

In contrast, when the controller 250 ascertains that the number of client mobile devices is not equal to a preset maximum connection number and concludes that BSS can be created, it may create a BSS using the BSS creation information included in the list of preferred mobile devices. Thereafter, the controller 250 updates the BSS creation information regarding a corresponding client mobile device in step 1030, and also the maximum connection number in step 1060.

As described above, the mobile device according to exemplary embodiments of the present invention may provide a tethering service to a number of client mobile devices using the multi SSIDs. In addition, the mobile device may flexibly create or delete BSSs within the maximum number of configuring BSSs, irrespective of the security mode of client mobile device that is connected thereto, while providing a tethering service. In addition, when the mobile device ascertains that a client mobile device that requests connection is a preferred mobile device that has been registered when it starts to perform a tethering function, it can provide a tethering service to the client mobile device, using the BSS creation information that was set previously.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A tethering method of a mobile device, the method comprising:
 determining, when the mobile device receives a connection request from a client mobile device, a number of client mobile devices that are currently connected to the mobile device;

determining a number of created Basic Service Sets (BSSs) if the number of connected client mobile devices is less than a preset maximum connection number;

determining identification-information regarding the client mobile device that requested connection when the number of BSSs is less than a preset maximum creation number; and providing a tethering service to the client mobile device according to the determined identification-information, wherein a rejection message corresponding to the connection request is transmitted to the client mobile device if the number of connected client mobile devices is equal to or greater than the preset maximum connection number.

2. The method of claim 1, wherein the providing of the tethering service comprises:

providing a tethering service to the client mobile device that requested connection, when the determined identification-information is included in a list of preferred mobile devices that are previously set;

determining whether a preferred mobile device registration is selected, when the determined identification-information is not included in a list of preferred mobile devices that are previously set; and updating, when a preferred mobile device registration is selected, BSS creation information, set in the client mobile device, in the list of preferred mobile devices.

3. The method of claim 2, wherein the list of preferred mobile devices comprises at least one of a Media Access Control (MAC) address of the client mobile device, an encryption key, a security mode, a Service Set Identifier (SSID), and identification-information regarding the client mobile device.

4. The method of claim 2, wherein the list of preferred mobile devices is created according to the frequency of connection of the client mobile device.

5. The method of claim 1, further comprising:

determining the degree of importance between client mobile devices that have been connected to the mobile device and a client mobile device that currently requests connection; and disconnecting part of the client mobile devices that have been connected thereto.

6. The method of claim 1, wherein the determining of the number of created BSSs comprises:

determining, when the number of BSSs is equal to or greater than a preset maximum creation number, creation information by BSSs that has already been created;

determining whether there is a BSS that is created in a security mode that is the same as the client mobile device that requested connection, via the determined creation information by the BSSs; and providing a tethering service to the client mobile device that requested connection, using the BSS created in the same security mode.

7. A mobile device for performing a tethering function, the device comprising:

a short-range communication unit for receiving a connection request from a client mobile device;

a storage unit for storing a list of preferred mobile devices used for determining whether the client mobile device is a preferred mobile device, and for storing Basic Service Set (BSS) creation information; and a controller for determining the number of client mobile devices currently connected to the mobile device when it receives the connection request via the short-range communication unit, for determining the number of created BSSs if the number of connected client mobile devices is less than a preset maximum connection number, and for providing, when the number of BSSs is less than a preset maximum creation number, a tethering service to the client mobile device according to identification-information regarding the client mobile device that requested connection, wherein the controller transmits a resection message corresponding to the connection request to the client mobile device if the number of connected client mobile devices is equal to or greater than the preset maximum connection number.

8. The device of claim 7, wherein the controller further comprises:

providing a tethering service to the client mobile device that requested connection, when the identification-information is included in a list of preferred mobile devices that are previously set;

determining whether a preferred mobile device registration is selected, when the determined identification-information is not included in a list of preferred mobile devices that are previously set; and updating, when a preferred mobile device registration is selected, BSS creation information, set in the client mobile device, in the list of preferred mobile devices.

9. The device of claim 7, wherein the list of preferred mobile devices is created according to the frequency of connection of the client mobile device.

10. The device of claim 7, wherein the mobile device determines the degree of importance between client mobile devices that have been connected to the mobile device and a client mobile device that currently requests connection, and then disconnects part of the client mobile devices that have been connected thereto.

11. The device of claim 7, wherein the list of preferred mobile devices comprises at least one of a Media Access Control (MAC) address of the client mobile device, an encryption key, a security mode, a Service Set Identifier (SSID), and identification-information regarding the client mobile device.

12. The device of claim 7, wherein the controller determines, when the number of BSSs is equal to or greater than a preset maximum creation number, creation information by BSSs that has already been created, determines whether there is a BSS that is created in a security mode that is the same as the client mobile device that requested connection, via the determined creation information by BSSs, and provides a tethering service to the client mobile device that requested connection, using the BSS created in the same security mode.

13. A tethering method of a mobile device, the method comprising:

receiving a connection request from a client mobile device;

identifying a Media Access Control (MAC) address of the client mobile device that requested connection;

determining whether there is a list of preferred mobile devices that are previously set;

determining whether the identified MAC address is included in the list of preferred mobile devices if there is the list of preferred mobile devices in the mobile device;

establishing a connection between the mobile device and the client mobile device if the identified MAC address is included in the list of preferred mobile devices; and serving as a modem to provide a modem function to the client mobile device, wherein a rejection message corresponding to the connection request is transmitted to the client mobile device if the number of connected client mobile devices is equal to or greater than a preset maximum connection number.

14. The method of claim 13, wherein serving as a modem to provide a modem function to the client mobile device comprises:
   determining Basic Service Set (BSS) creation information mapped to the client mobile device; and
   creating a BSS, using the determined BSS creation information.

15. The method of claim 13, wherein the list of preferred mobile devices further comprises at least one of an encryption key, a security mode and a Service Set Identifier (SSID).

16. The method of claim 13, further comprising:
   determining whether a preferred mobile device registration is selected, when the identified MAC address is not included in the list of preferred mobile devices; and
   updating, when a preferred mobile device registration is selected, the list of preferred mobile devices by using the identified MAC address.

17. The method of claim 13, further comprising:
   identifying BSS creation information that has already been created;
   determining whether there is a BSS that is created in a security mode that is the same as the client mobile device that requested connection, based on the identified BSS creation information; and
   serving as a modem to provide a modem function to the client mobile device that requested connection, using the BSS created in the same security mode.

18. A mobile device for performing a tethering function, the device comprising:
   a short-range communication unit configured to receive a connection request from a client mobile device;
   a storage unit configured to store a list of preferred mobile devices used for determining whether the client mobile device is a preferred mobile device, and to store Basic Service Set (BSS) creation information; and
   a controller configured to identify a Media Access Control (MAC) address of the client mobile device that requested connection, to determine there is a list of preferred mobile devices that are previously set, to determine whether the identified MAC address is included in the list of preferred mobile devices if there is the list of preferred mobile devices in the storage unit, to establish a connection between the mobile device and the client mobile device if the identified MAC address is included in the list of preferred mobile devices, and to serve as a modem to provide a modem function to the client mobile device,
   wherein the controller is further configured to transmit a rejection message corresponding to the connection request to the client mobile device if the number of connected client mobile devices is equal to or greater than a preset maximum connection number.

19. The device of claim 18, wherein the controller is further configured to:
   determine BSS creation information mapped to the client mobile device; and
   create a BSS, using the determined BSS creation information.

20. The device of claim 18, wherein the list of preferred mobile devices further comprises at least one of an encryption key, a security mode and a Service Set Identifier (SSID).

* * * * *